LINE IDENTIFICATION CIRCUIT FOR TELEPHONE SYSTEMS

Original Filed Sept. 20, 1940 7 Sheets-Sheet 1

| | | | | |
|---|---|---|---|---|
| | | FIG. 6 | FIG. 7 | |
| FIG. 1 | FIG. 2 | FIG. 3 | FIG. 4 | FIG. 5 |

INVENTORS W. H. T. HOLDEN
B. F. LEWIS
BY
ATTORNEY

LINE IDENTIFICATION CIRCUIT FOR TELEPHONE SYSTEMS

Original Filed Sept. 20, 1940 7 Sheets-Sheet 2

INVENTORS W. H. T. HOLDEN
BY B. F. LEWIS

ATTORNEY

LINE IDENTIFICATION CIRCUIT FOR TELEPHONE SYSTEMS

Original Filed Sept. 20, 1940 7 Sheets-Sheet 3

INVENTORS W. H. T. HOLDEN
B. F. LEWIS
BY
ATTORNEY

LINE IDENTIFICATION CIRCUIT FOR TELEPHONE SYSTEMS

Original Filed Sept. 20, 1940 7 Sheets-Sheet 4

INVENTORS W. H. T. HOLDEN
B. F. LEWIS
BY
ATTORNEY

LINE IDENTIFICATION CIRCUIT FOR TELEPHONE SYSTEMS

Original Filed Sept. 20, 1940 7 Sheets-Sheet 5

INVENTORS W. H. T. HOLDEN
B. F. LEWIS
BY

ATTORNEY

LINE IDENTIFICATION CIRCUIT FOR TELEPHONE SYSTEMS

Original Filed Sept. 20, 1940 7 Sheets-Sheet 6

INVENTORS W. H. T. HOLDEN
B. F. LEWIS
BY
ATTORNEY

LINE IDENTIFICATION CIRCUIT FOR TELEPHONE SYSTEMS

Original Filed Sept. 20, 1940 7 Sheets-Sheet 7

INVENTORS W. H. T. HOLDEN
B. F. LEWIS
BY
ATTORNEY

Reissued July 10, 1951

Re. 23,388

UNITED STATES PATENT OFFICE 23,388

LINE IDENTIFICATION CIRCUIT FOR TELEPHONE SYSTEMS

William H. T. Holden, Woodside, and Benjamin F. Lewis, Bayside, N. Y., assignors to Bell Telephone Laboratories, Incorporated, New York, N. Y., a corporation of New York Original No. 2,284,870, dated June 2, 1942, Serial No. 357,520, September 20, 1940. Application for reissue May 17, 1950, Serial No. 162,576

11 Claims. (Cl. 179—27)

Matter enclosed in heavy brackets [ ] appears in the original patent but forms no part of this reissue specification; matter printed in italics indicates the additions made by reissue.

This invention relates to telephone systems and more particularly to those systems in which the numerical indication of a calling line is automatically determined and made available.

It is well known that in certain types of telephone connections such as those, for instance, in which the calling line is extended automatically or otherwise to some remote station, it is sometimes necessary to ascertain the number of the calling station in order that charges for the call may be properly assessed to said station. Such connections are known as toll or long distance connections and in some types of automatic telephone systems in which the calling line is routed to its destination via the position of a recording operator where, after the number has been communicated to the operator by the calling subscriber, said number is verified over a so-called checking multiple. This verification is made by touching the tip of a checking cord to a pin in the checking multiple that is assigned to the given number and if the number as given by the calling party is correct, a tone circuit is completed over the checking cord which is heard in the operator's telephone set. On the other hand, if the number as given does not correspond to that of the pin to which the tip of the checking cord is touched, the tone circuit is not completed, which fact indicates to the operator that the number given by the calling party does not correspond to that of the station from which he is calling and service may then be denied until the discrepancy is rectified.

In automatic telephone systems, it is desirable to have the identity of the calling station ascertained and transmitted automatically to some point at which it may be recorded on settable registers for the visual display of the number, if the call is completed through an operator's position, or for automatic recording if the information is to be utilized for operating printing or other recording devices responsive to the setting of the registers.

Our invention is principally concerned with the automatic identification of the calling line number, and its principal feature is an arrangement of two main groups of electronic devices provided with multicontrol elements which, when operated, produce two coordinate translations, one for each two digits of the line number, each of which may then be suitably resolved into a single translation for each digit. Similar identifying arrangements are utilized in the *then* copending application of W. A. Rhodes Serial No. 357,518, *which issued as Patent No. 2,267,950 on December 30, 1941*, and the copending application of [W. A.] *H. M.* Bascom et al. Serial No. 357,519 *which issued as Patent No. 2,270,246 on January 20, 1942*, both *of said copending applications having been* filed on September 20, 1940.

Another feature of our invention is an arrangement of four auxiliary groups of electronic deivces which, operating in conjunction with those of the two main groups, resolve the two-digit translations made by each main group of devices into single-digit translations, one for each digit of the line number.

According to one embodiment of the invention as adapted to provide identification for each of the lines of a ten thousand-line telephone office and in which the electronic devices employed are of the so-called cold cathode gas-filled type well known in the art which break down and become conducting upon the application of a critical or "breakdown" potential to a control anode, we propose to use two main groups of one hundred such cold cathode tubes each having one hundred control or starting anodes with each line to be identified connected to a starting anode in a tube of each group, and four auxiliary groups of ten cold cathode tubes each having ten starting anodes with each cathode of a main tube connected to a starting anode in a tube in each of two auxiliary groups. Upon the application of a distinct signaling voltage to any one of the lines, the two tubes in the main groups having, *respectively*, one of their starting anodes connected to the line become conducting, and their conduction immediately activates each of the four tubes in the auxiliary groups having anodes connected to the cathodes of the two conducting tubes in the main groups. Since each of the auxiliary tubes bears a digital coordinate relation to its associated main tube, there is present in the four operated auxiliary tubes four distinct signals each of which designates a digit of the line *number*. These signals may, of course, be received upon suitable registers from which the number may then be displayed or recorded by appropriate apparatus provided for the purpose.

A clearer conception of the scope and purpose of the invention may be obtained from the following description, taken in connection with the appended claims and attached drawings, in which—

Fig. 1 shows a schematic layout of an automatic telephone line extension in a telephone system of a well-known type;

Fig. 7 shows, in part, the other two auxiliary groups of tubes which are operatively associated with the main group of tubes shown in Fig. 6; while

Referring now, to the drawings, there are provided as indicated therein one hundred tubes, namely tubes 00 to 99, inclusive, for the thousands and hundreds digit designations of the various ones of the ten thousand line[s] *numbers* in a telephone office and one hundred other tubes, namely, 600 to 699, inclusive, for the tens and units designations of said line[s] *numbers*. Each tube in each group has one hundred and two elements, namely, a main anode indicated by an arrowhead within the tube envelope and connected to conductor 242, a main cathode indicated by a long slender rectangle within the tube envelope each connected to a source of negative potential, and one hundred starting anodes indicated as short lines perpendicular to the cathode within the tube envelope. There are, therefore, twenty thousand main tube control anodes for the entire circuit.

Figure 8:
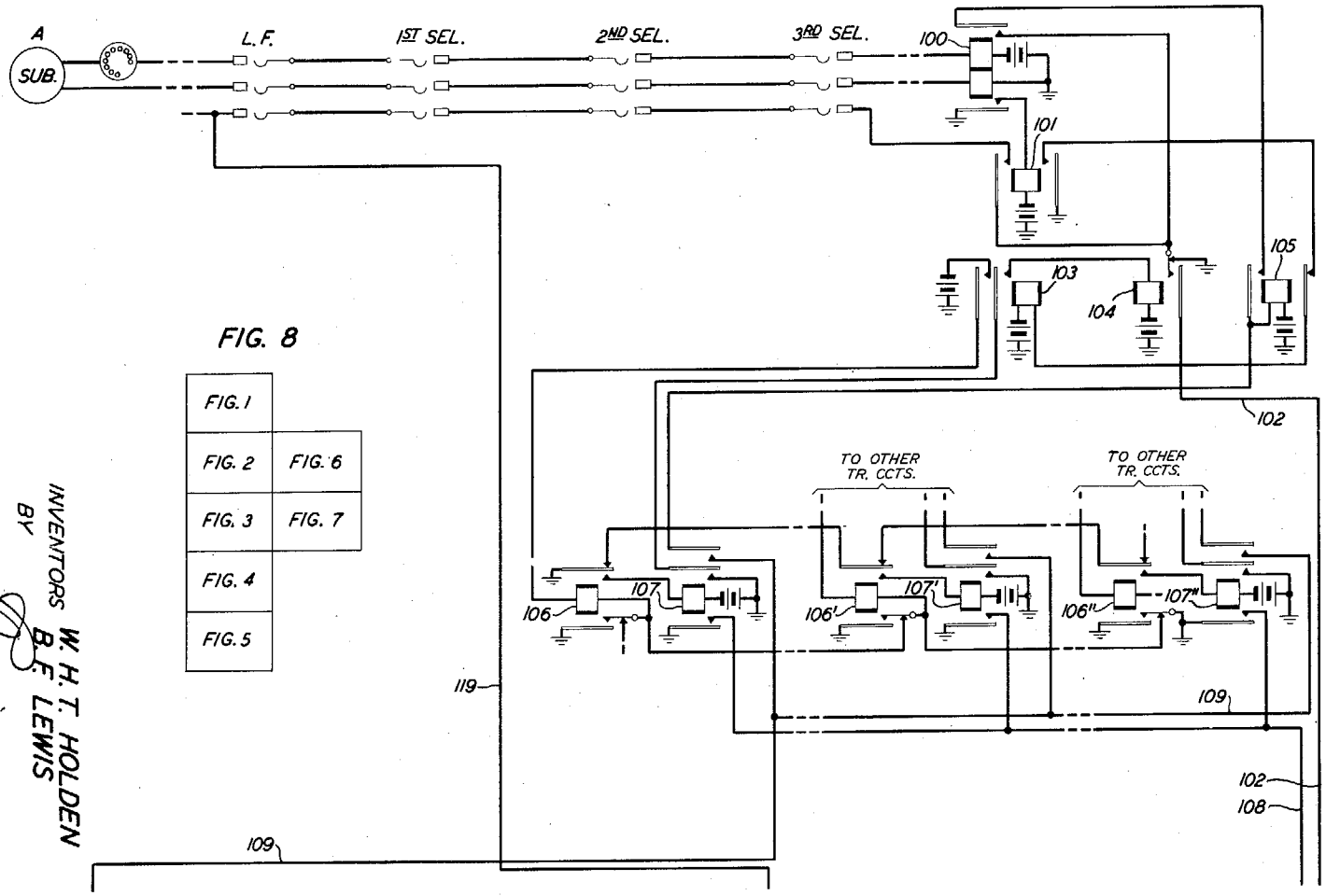
Fig. 8 shows the manner in which Figs. 1 to 7, inclusive, should be arranged with respect to each other in order to disclose the invention.
Figure 2:
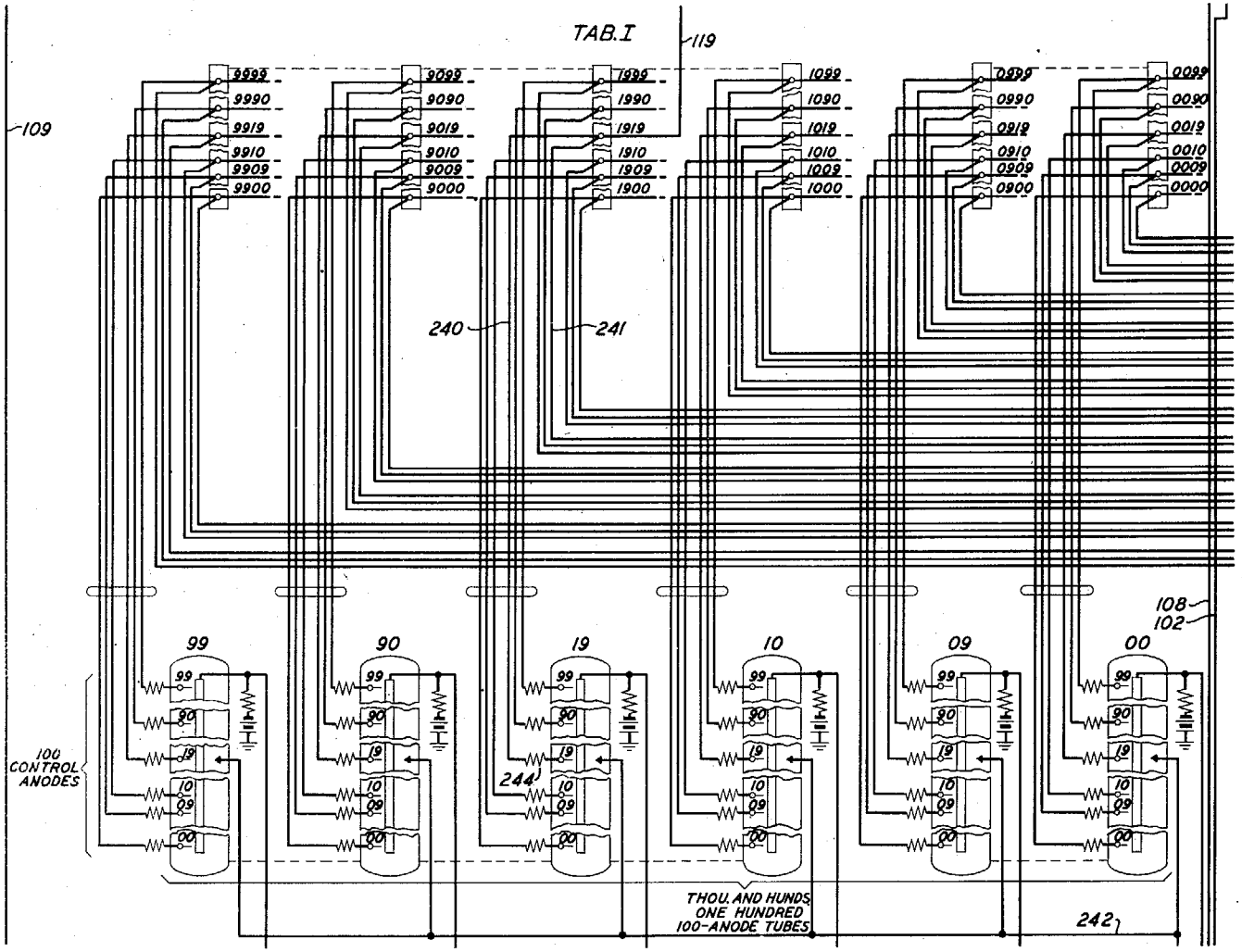
Fig. 2 shows, in part, one of the two main groups of tubes.
Figure 3:
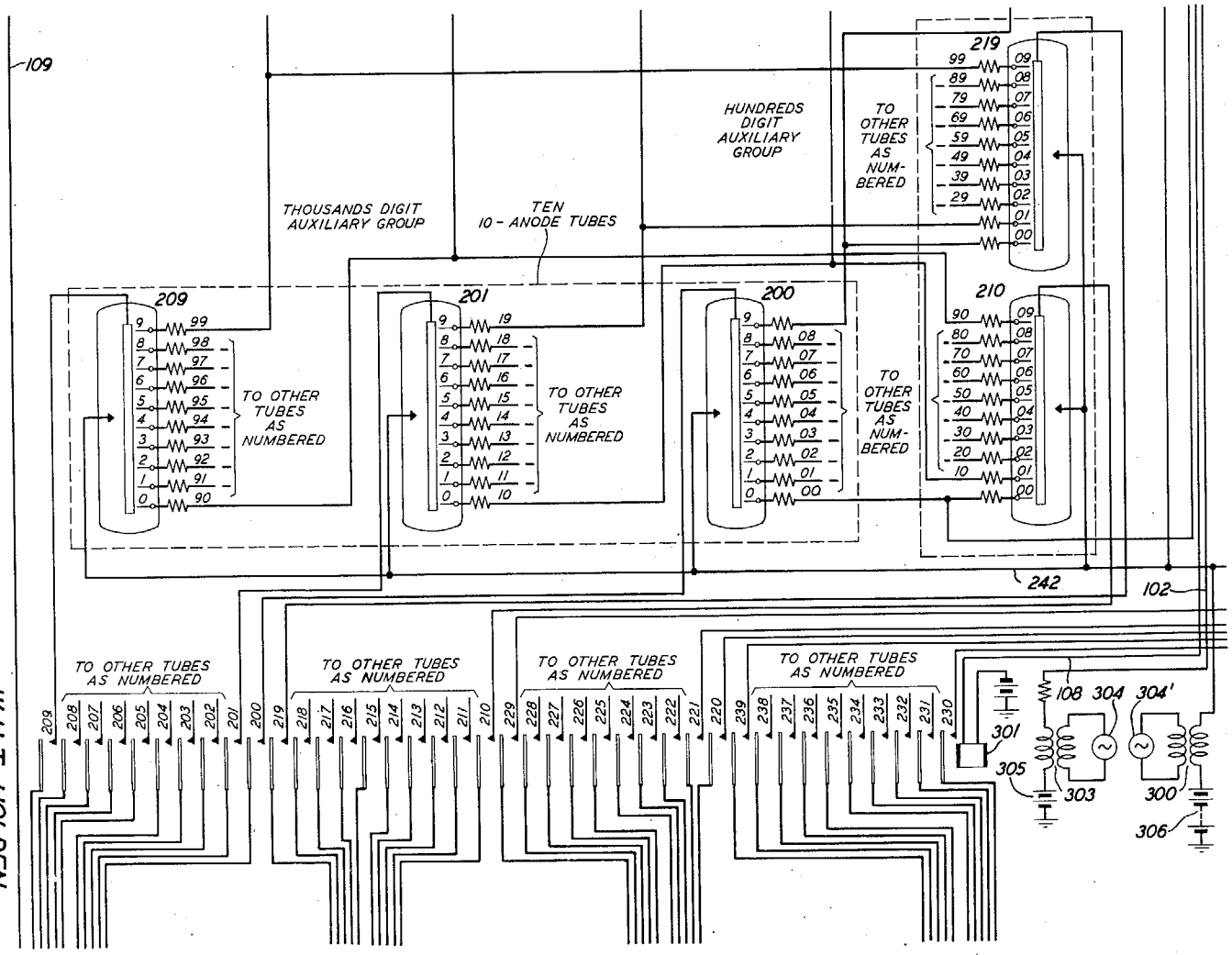
Fig. 3 shows, in part, the two auxiliary groups of tubes which are operatively associated with the main group of tubes shown in Fig. 2.
Figure 4:
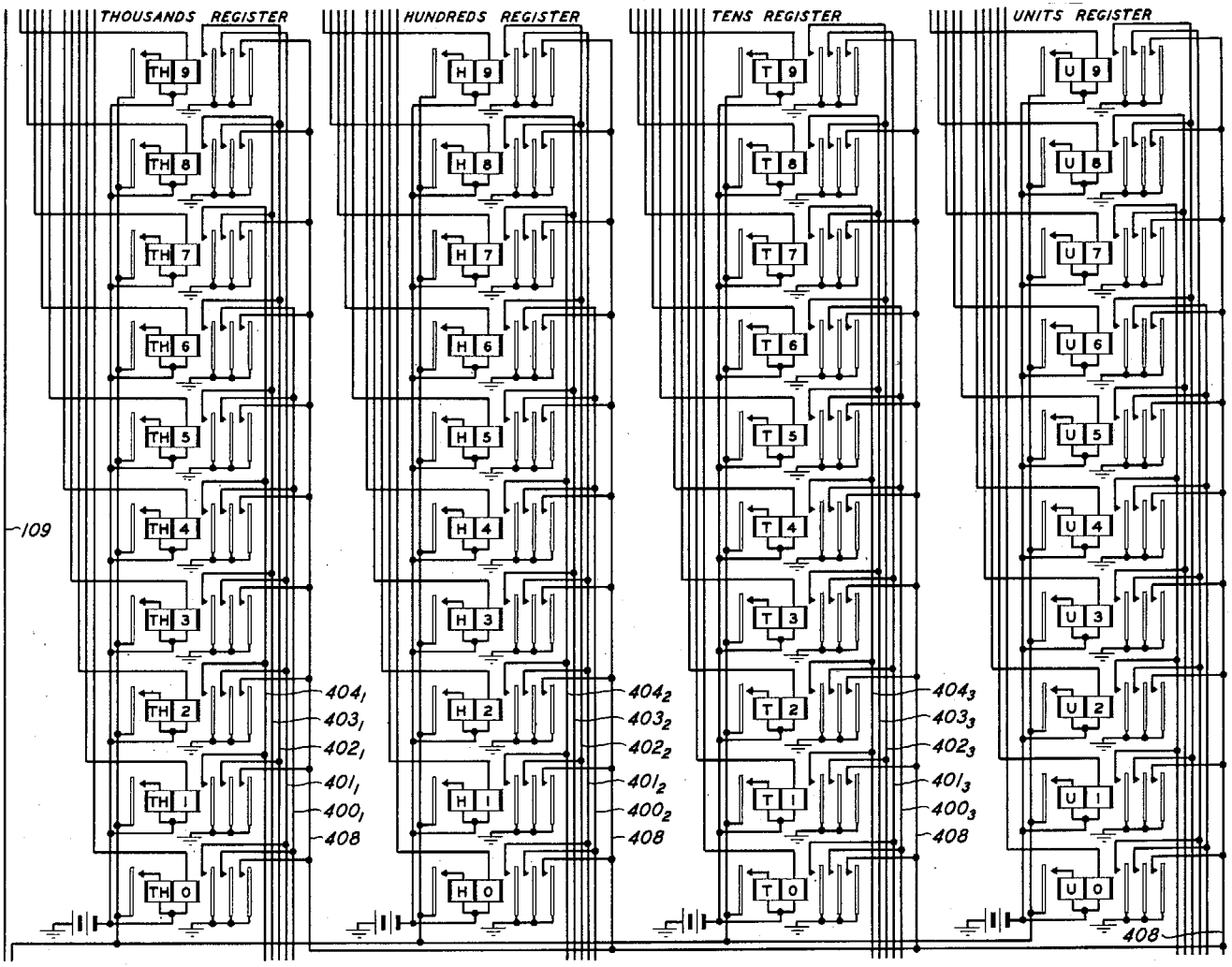
Fig. 4 shows the digit registers.
Figure 5:
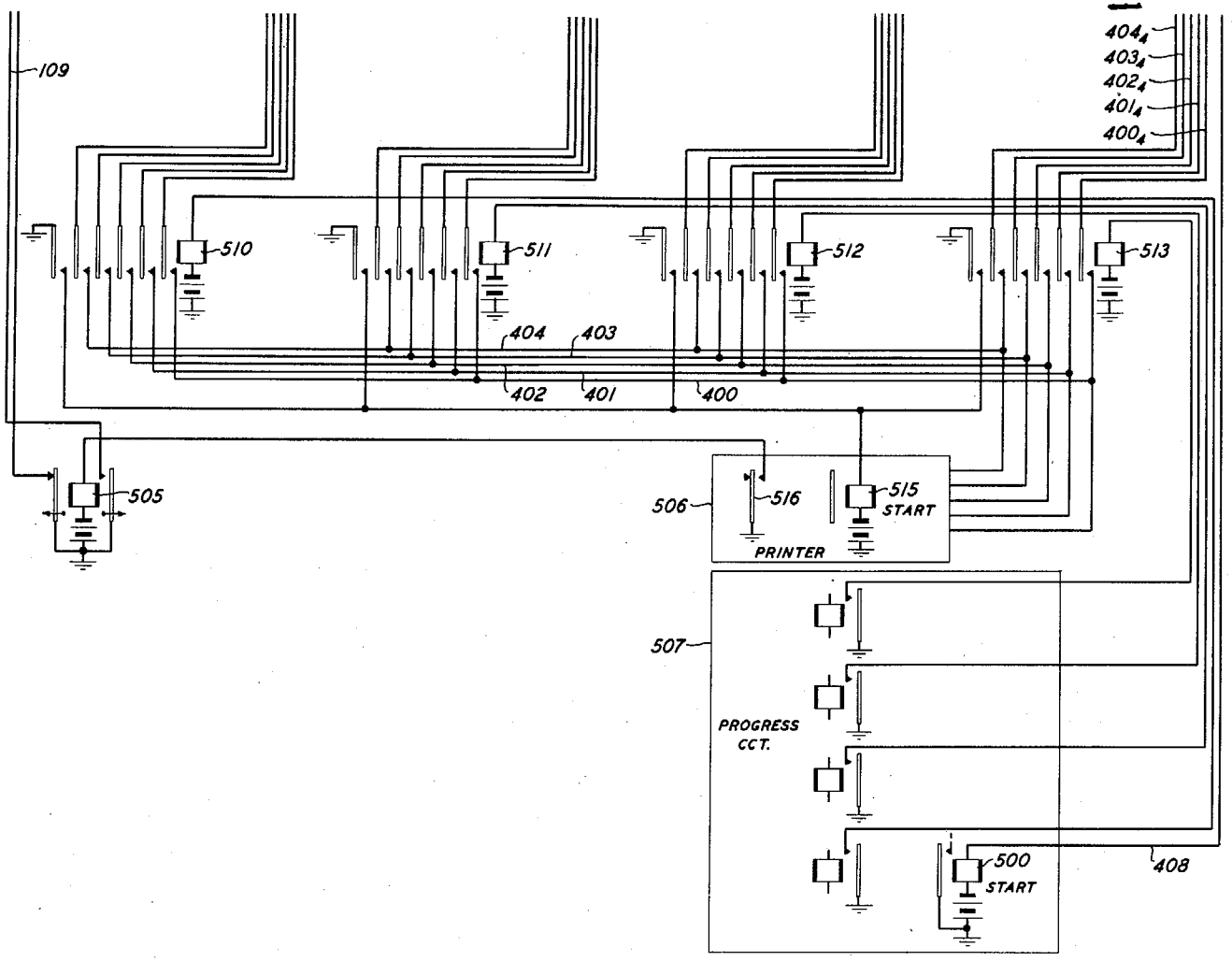
Fig. 5 shows, diagrammatically, the switching circuit, the progress circuit and the printer.
Figure 6:
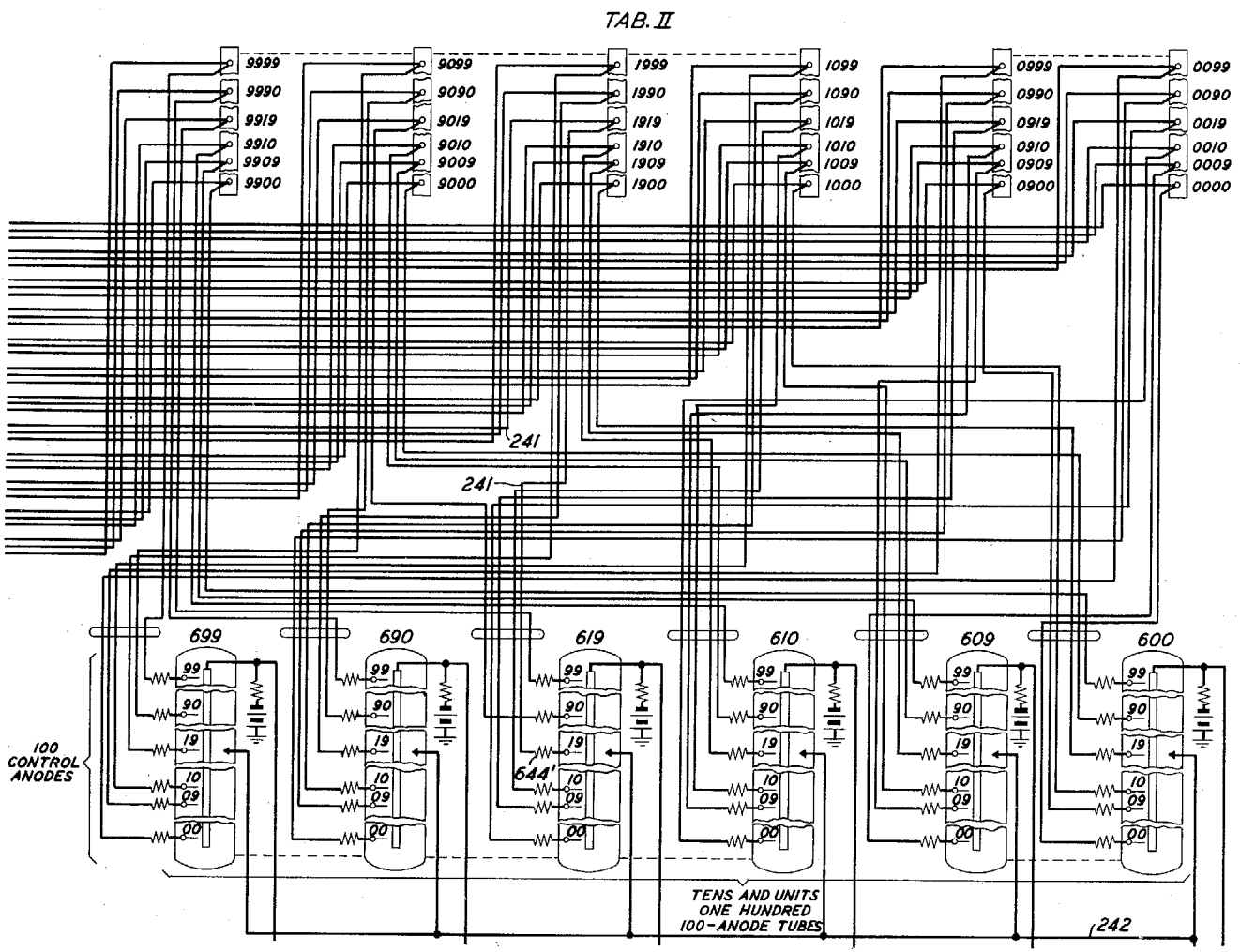
Fig. 6 shows, in part, the other of the two main groups of tubes.
Figure 7:
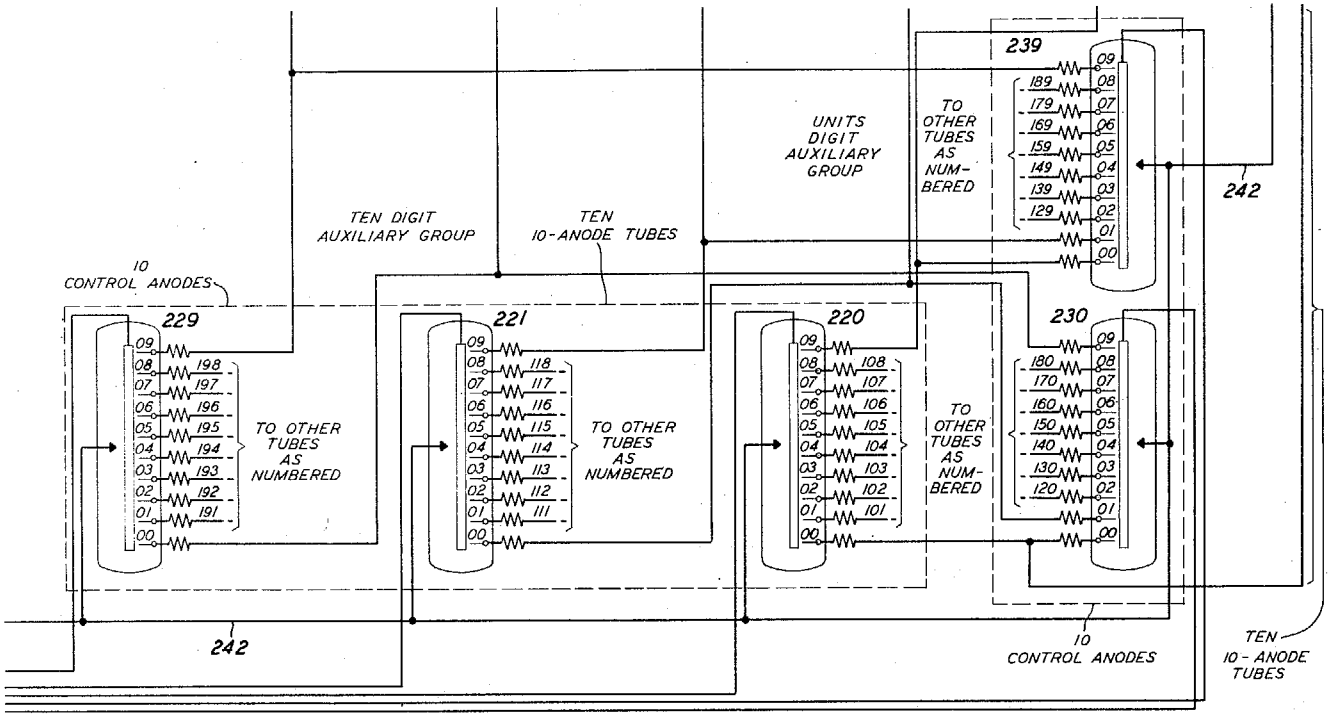

Each line is provided with an identifying conductor, preferably an extension of its sleeve as, for instance, conductor 119, and this conductor is connected to a punching on the terminal assembly block TAB—I which is assigned to the line correlated to the identifying conductor. Thus in Figs. 1 and 2, conductor 119 is connected to terminal punching 1919, and line A is assumed to have the same numerical designation as the punching. It will be observed that the terminal assembly block TAB—I is arranged in vertical sections of one hundred punchings to the section, there being, for a ten thousand line office, one hundred such sections with each section allocated to a particular group of one hundred lines to the punchings of which are connected the sleeve extensions of the related lines, in the same manner as already described for line A (1919).

From the other side of the punchings of TAB—I extend two parallel conductors, one to a control anode in one of the one hundred tubes 00–99 and the other to a control anode in one of the one hundred tubes 600–699 *the latter conductor* via a punching on terminal assembly block TAB—II which is identical in structure and arrangement to TAB—I. The tube in each group to which each of said conductors is connected depends, in the case of the first group of tubes 00–99, upon the thousands and hundreds numerical designation of the line and, in the case of the second group of tubes 600–699, upon the tens and units designation of [the line] *said numerical designation*. Furthermore, since, as a matter of convenience, the one hundred control anodes in each of the tubes of both main groups *of tubes* are themselves numerically designated in consecutive order, the particular control anode in each tube to which each of the above conductors would be connected may be made to depend upon the identity between the numerical designation of the anode and the numerical designation of the two digits of the line number which are to be identified by a tube in the other main group.

Thus, punching 1919 on TAB—I which, on one side is connected to conductor 119 is connected on its other side to conductors 240 and 241. The line 1919 has a thousands-hundreds digit designation of "19" and since tube 19 is reserved for the identification of the numerical designation of the one hundred lines in the office bearing the thousands-hundreds designation "19" conductor 240 is extended to a control anode in tube 19 and, via resistance 244, particularly to the anode therein labeled 19; anode 19 having been selected because it bears the same numerical designation in the consecutive line-up of the hundred anodes of the tube as the tens-units designation of the line *number*. In the same way, conductor 241 extends to terminal punching 1919 in the terminal assembly block TAB—II and thence to a control anode in tube [119] *619*, and particularly to control anode 19 therein via conductor 241 and resistance 644'. Here again the particular anode in the tube selected for connection to conductor 241 may be determined as a matter of convenience by the thousands-hundreds designation of the line number which, in the case of line number 1919 (line A) happens to be the same as the tens-units designation.

The identifying conductor of every line in each hundred line group of the one hundred such groups for a 10,000 line office is thus similarly extended, via a resistance, to a control anode in the particular tube in the group of tubes 00–99 which is reserved for the thousands-hundreds identification of that group and, via another resistance, to a control anode in the particular tube in the group of tubes 600–699 which is reserved for the tens-units identification of that group. It is obvious that the operation of a tube in each group, each having one of its control anodes connected to the identifying conductor of a line through its extension from the punchings on terminal assembly blocks TAB—I and TAB—II may be used to operate auxiliary equipment and signaling apparatus that will identify the con[ductor] *ductors* and, therefore, the line.

Since the operation of a tube in the main group of tubes 00–99 and the operation of another tube in the main group of tubes 600–699 each identifies a pair of digits of the line number, additional translations are necessary in order to [trace back] resolve the identity of each of the four digits of which the line number is composed. To carry out these translations, two auxiliary groups of ten ten-control anode tubes are provided for each main group of tubes 00–99 and 600–699, one auxiliary group for each of the two digits decoded by a main group of tubes. These tubes are numbered 200 to 209, 210 to 219, inclusive, for the group of thousands-hundreds tubes 00–99, and 220 to 229, and 230 to 239, inclusive, for the group of tens-units tubes 600–699. The cathodes of the tubes in each of the main groups are connected to negative battery through a high resistance, and conductors are brought from each of said cathodes to a start anode in a tube in each of the associated auxiliary group. The order of connection is ten cathodes from as many consecutively numbered tubes in a main group connected, respectively, to as many control anodes in a tube of one of the auxiliary groups, and each one of the same cathodes connected respectively to a control anode in each of the ten tubes in the other auxiliary group. The reason for this is that, in the case of the thousands-hundreds digits, for example, the auxiliary group of tubes 200–209 inclusive is used to identify the different thousands digits of the line numbers, and inasmuch as there will be a maximum of ten different numerical values of the hundreds digit for each numerical value of the thousands digit, the cathodes of the ten tubes which are to identify the same thousands digit designation of the line number for each different numerical value of the hundreds digit are connected to as many control anodes in the same tube of the auxiliary group 200–209 and to a control anode in each of the ten tubes of the other auxiliary group 210–219, the selection of the tube to whose control anode the cathode of the main tube is to be connected being determined, of course, by the correspondence of the units digit of the numerical designation of the tube in the main group and that of the tube in the auxiliary group. In the same manner for the tens-units digits. The auxiliary group of tubes 220–229, inclusive, is used to identify the different tens digit of the line numbers, and inasmuch as there will be a maximum of ten different numerical values of the units digit for each numerical value of the [hundreds] *tens* digit, the cathodes of the ten tubes which are to identify the same tens digit of the line number for each different numerical value of the [units] *hundreds* digit are connected to as many control anodes in the same tube of the auxiliary group 220–229 [and to a control anode in each of the ten tubes of the other auxiliary group 230–239.] *In the same manner for the identification of the ten different values of the units digit, the cathode in each of the main group of tubes 600–699 identifying the same numerical value of the units digit being each connected to an anode in the one tube of the auxiliary group of tubes 230–239 which is reserved for the numerical value of said digit. In each case* the selection of the tube *in each group* to *one of* whose control [anode] *anodes* the cathode of the main tube is to be connected being determined, of course, by the correspondence of the *tens and* [units] *appropriate* digit of the numerical designation of the tube in the main group and that of the tube in the auxiliary group.

The following table shows the distribution of connections.

| Tube in the main groups | Connections to tubes in respective auxiliary groups |
|---|---|
| 00 | 200 and 210 |
| 01 | 200 and 211 |
| 02 | 200 and 212 |
| --- | --- |
| --- | --- |
| --- | --- |
| 09 | 200 and 219 |
| 10 | 201 and 210 |
| 11 | 201 and 211 |
| --- | --- |
| --- | --- |
| --- | --- |
| 19 | 201 and 219 |
| --- | --- |
| --- | --- |
| --- | --- |
| 90 | 209 and 210 |
| 91 | 209 and 211 |
| --- | --- |
| --- | --- |
| --- | --- |
| 99 | 209 and 219 |
| 600 | 220 and 230 |
| 601 | 220 and 231 |
| --- | --- |
| --- | --- |
| --- | --- |
| 609 | 220 and 239 |
| 610 | 221 and 230 |
| 611 | 221 and 231 |
| --- | --- |
| --- | --- |
| --- | --- |
| 619 | 221 and 239 |
| 620 | 222 and 230 |
| --- | --- |
| --- | --- |
| --- | --- |
| 698 | 229 and 238 |
| 699 | 229 and 239 |

The anode voltage for all tubes is a superposed alternating current supplied by source 304' connected to the primary of transformer 300 the secondary of which is connected to negatively grounded battery 306 and to conductor 242 which connects with all tube anodes. Preferably the source should be 100 volts direct current plus 70 volts alternating current corresponding to a peak value of 200 volts. With 80 volts drop in the glow discharge of any of the tubes there will be a maximum of 120 volts during slightly more than the positive half cycle of anode voltage across the cathode resistances of the tubes in the main groups, so that there will be ample voltage to operate the control gaps of the tubes in the auxiliary groups. However, this is intended merely by way of illustration as it is obvious that the voltage values to be supplied cannot be fixed with any considerable accuracy as they will depend upon the characteristics of the tubes used.

The cathode of each tube in each of the two auxiliary groups of tubes [210–239] *200–239* is connected to a contact of multicontact relay 301 while the armature making with said contact is joined to a winding of a register relay. There is provided a register of ten relays for each of the digits to be identified, namely, a thousands register comprising relays TH0–TH9, a hundreds register comprising relays H0–H9, a tens register comprising relays T0–T9 and a units register comprising relays U0–U9. Each relay in each register is double wound with the right winding connected to an armature of said multicontact relay 301, the connections to all relays being made consecutive in order to group the relays of each register with the cathodes of the tubes of the particular auxiliary group that identifies the digit reserved for the register.

The register relays are provided with a locking circuit to ground on the contacts of relay 505. They are also provided with two pairs of contacts which, when operated, apply ground to two of the five local conductors 400—404—, inclusive, in the appropriate combination called for by the following code to indicate the digit designated by the operated relay in the registers, and provided, further, with a third pair of contacts which ground conductor 408 for operating start relay 500 for a purpose set forth hereinafter.

Tables of codes

| Register relay operated | Conductors grounded | Digit designated |
|---|---|---|
| —0 | 400, 401 | 0 |
| —1 | 402, 404 | 1 |
| —2 | 401, 404 | 2 |
| —3 | 401, 403 | 3 |
| —4 | 400, 404 | 4 |
| —5 | 400, 403 | 5 |
| —6 | 400, 402 | 6 |
| —7 | 403, 404 | 7 |
| —8 | 402, 403 | 8 |
| —9 | 401, 402 | 9 |

The groups of five local conductors 400—400— inclusive of each register are connected in consecutive order to the armatures of a relay 510, 511, 512, and 513, the make contacts of which extent to the magnets of any commercially available printer 506 via conductors 400–404. Thus conductors $400_1$–$404_1$ of the thousands register are connected to the armatures of relay 510; those of the hundreds register $400_2$–$404_2$ are connected to the armatures of relay 511; those of the tens register $400_3$–$404_3$ to the armatures of relay 512 and those of the units register $400_4$–$404_4$ to the armatures of relay 513. These relays are operated in a cyclical order by any suitable progress circuit 507 which first operates relay 510 to connect conductors $400_1$–$404_1$ of the thousands register to the printer 506; then operates relays 511, 512 and 513 in the order given to connect, in succession, the signaling conductors of the other three registers operatively associated with the above relays. Inasmuch as each register will have one of its relays operated at the time of the cut-through to the printer, as will be shortly described, the two conductors in the register group which are grounded by said relay will cause the printer to operate and print the digit designated by said grounded conductors.

Having described the structural arrangement of our invention, its manner of operation when adapted to a specific type of telephone system will now be set forth in some detail.

In Fig. 1 is shown a schematic disclosure of the equipment at the originating office of an automatic telephone system of the so-called step-by-step type wherein switching selectors, shown in the figure as 1st selector, 2nd selector, etc., are usually settable directly in response to dial pulses from an originating station to reach the terminals of a wanted station. In telephone connections involving the necessity of identifying the number of the calling station such as, for instance, long distance connections, the line is usually routed through a 3rd selector whence it is extended to its destination by well-known means. If, therefore, the switching train reaches the 3rd selector switch and this switch selectively connects itself to an outlet reserved for calls necessitating the verification of the calling line number, the line identification circuit comprehended by this invention is automatically connected to the trunk by any suitable means and proceeds with its operation of determining the number of the calling station.

The line identification circuit is used in common by a group of trunks and, in its operation is, of course, used only by one trunk at a time, an interval during which other trunks await their turn in any desired preferential order for connection therewith to obtain similar line identification service. Connector circuits by which a common circuit is connected to a plurality of individual circuits on a lock-out basis are well known and numerous in the switching art. The connecting circuit shown in Fig. 1, therefore, is merely illustrative of a number of other and similar connecting circuits which might be used.

We may now assume that station A, identified by line number 1919, initiates a call which requires line identification. When the various selectors have been selectively positioned to engage a trunk on the 3rd selector bank, line relay 100 of said selector operates over the line loop, causing thereby the operation of relay 101 over its lower contacts which, in turn, completes a circuit for relay 103 which extends from ground on the right contacts of relay 101, right contacts of relay 105, winding of relay 103 to battery. Relay 103, upon operating, closes a path for relay 106 which extends from battery through the left outer contacts of relay 103, winding of relay 106, through the lower continuity contacts of relays 106'—106'' which relays are identical with relay 106 but individual to each of the trunks having access to the identification circuit, to ground. If all the relays 106—106'—106'' are normal, which indicates that no trunk is locked in with the identification circuit, relay 106 will operate. On the other hand, if one of said relays is operated, indicating thereby that a trunk is locked in with the identification circuit, then the above circuit will not be completed and relay 106 will not operate, in which event the connection will wait until the circuit is established. Assuming, however, that all trunks are disconnected from the identification circuit, then relay 106 operates, locks itself to ground through its lower front contacts and completes an obvious circuit for relay 107 which, upon operating, grounds conductor 108 and thereby causes the operation of relay 301, closes through release conductor 109 to the winding of relay 105 and completes a circuit for relay 104 which extends from ground through the upper inner contacts of relay 107, inner contacts of relay 103, winding of relay 104 to battery. Relay 104 operates and connects conductor 102 to the sleeve of the connection via the left contacts of relay 101 and thence to identifying conductor 119 of the line A.

It will be observed that while relay 106 is operated, other trunks might cause their respective relays 106' to operate if they are located, electrically, to the right of relay 106. However, their operation will be ineffective since it will not be possible to operate their associated relay 107' inasmuch as the circuit of this relay is controlled over a chain connection to the left, back to the upper back contacts of relay 106, which, being operated, opens the path of all other relays 107'—107'' except relay 107.

Conductor 102 which is now connected to conductor 119 via the sleeve of the selector train is connected to the secondary winding of transformer 303 which has its other terminal connected to positive battery 305. Inasmuch as alternating current source 304 is connected to the primary winding of transformer 303 and source 304' is connected to transformer 300, and since grounded negative battery 305 is connected to the secondary winding of transformer 303, a superimposed alternating potential is applied to conductor 102 (which is, of course, lower than the potential applied to the tube main anodes through transformer 300 in a conductor 242') and thereover via the sleeve of the selector train to conductor 119, punching 1919 of terminal assembly block TAB—I, conductor 240, resistance 244 to control anode 19 of tube 19 and, also, conductor 241, punching 1919 of terminal assembly block TAB—II, resistance 644' to control anode 19 of tube 619. It will be observed that grounded positive battery through a resistance is connected to the cathode of each tube in the groups 00–96 and 600–699. The difference of potential created by the superimposed positive voltage at anode 19 of tube 19 as traced thereto from the primary of transformer 303 and the negative resistance battery connected to the cathode of tube 19 is sufficient to break down the control gap between the cathode and said anode. Similarly, the difference of potential between anode 19 and the cathode of tube 619 is sufficient to break down the control gap between the cathode and said anode. Both tubes 19 and 619, on being rendered conducting through the control gaps thereof, immediately break down in their respective main gaps inasmuch as positive superimposed potential through the secondary of transformer 300 is connected to the main anode of each of the tubes in the two main groups as already explained, and the difference of potential [created] *established* between the cathode and main anode of the two tubes—19 and 619—upon the flow of current between their respective cathodes and one of the control anodes in each of the tubes, is such as to cause said tubes to break down in their respective main gaps and become conducting therethrough.

As already explained, the [main anode] *cathode* of each tube in the group of tubes 00–99 is connected to a control anode of a tube in each of its auxiliary groups of tubes 200–209 and 210–219. The same thing is true of the tubes in the group 600–699 in which the [main anode] *cathode* of each tube is connected respectively, to a control anode of an appropriate tube in each of the two auxiliary groups of tubes 220–229 and 230–239 as already described. In the case of tube 19, the [main anode] *cathode* thereof is connected to control anode 19 of tube 201 and to control anode 01 of tube 219; in case of tube 619, the [main anode] *cathode* thereof is connected to control anode 09 of tube 221 and to control anode 01 of tube 239. However, since relay 301 is operated, the cathode of each tube in all four auxiliary groups is connected to negative battery through the operating winding of a relay in one of the numerical registers. Specifically, the cathode of each tube in the group 200–209 is connected to negative battery through the winding of one of the relays of the thousands register, the cathode of each tube in group 210–219 is connected to battery through the winding of one of the relays in the hundreds register, the cathode of each tube in group 220–229 is connected to battery through the winding of one of the relays in the tens register and the cathode of each tube in group 230–239 is connected to battery through the winding of a relay in the units register.

In tube 201, the difference [of] *in* potential between [that on] control anode 19 and [that on] the cathode of the tube, applied thereto by grounded positive battery through the winding of relay TH1, is sufficient to break down the control gap of the tube thereby causing it to become conducting therethrough, and the flow of space current created thereby establishes a sufficient potential difference between the potential on the cathode of the tube and the superimposed alternating potential, applied to its main anode via conductor [202,] *242* through the secondary winding of transformer 300 as to cause the tube to ionize its main gap and produce a flow of current through the main anode and cathode paths. Since relay TH1 is included in this circuit path, said relay now operates over its right winding and locks over its left winding and contacts to ground on the contacts of relay 505.

In the same manner as above described, tube 219 is rendered conducting to cause the operation of relay H9 in the hundreds register; tube 221 is rendered conducting to cause the operation of relay T1 in the tens register and tube 239 is rendered conducting to cause the operation of relay U9 in the units register. These relays operate over their respective right windings and lock over their respective left windings and contacts to ground on the contacts of relay 505. It will be noted that the above relays, when operated, register the number 1919 which, as above described, is the line number of the calling station A.

Relays TH1, H9, T1 and U9 all apply ground to the common conductor 408 which connects with the winding of the start relay 500 in the progress circuit, and causes said relay to operate and start the operation of said progress circuit, which may be of any suitable design, to complete circuits (not shown) whereby relays 510, 511, 512 and 513 are operated in the order given and whereby the succeeding relay is not operated until the preceding one is released, and whereby the interval during which each of said relays is maintained in an operated position is sufficient to cause the performance of the registering or recording functions indicated below.

The apparatus supplied to receive the signal grounds applied to the four different groups of conductors 400—404– inclusive by the operation of a relay in each of the digits registers depends upon the kind of an indication of the calling number desired, as it is evident that any settable device adapted to record or register the application of grounds to said conductors and translate them into a visual, oral or recorded [resignation] *designation* of the calling number, will do. In the description of the invention herein given, merely by way of illustrating its operation, it is assumed that a permanent record of the calling line number is desired and that this record is to be a printed one which can be produced by any commercially available printer 506. When, therefore, relay 510 operates in preparation to record the thousands digit, an obvious circuit is closed for start relay 515 in the printer 506. Relay 515 operates to prepare the printer to receive the signal grounds on conductors $402_1$ and $404_1$ of the thousands register via the contacts of relay 510 and conductors 402—404, which grounds cause the operation of two corresponding printer magnets upon the operation of which the thousands digit 1 (according to the above table) is printed.

Following the release of relay 510 by the progress circuit, the start relay 515 also releases to restore the printer. Upon the operation of relay 511, the five signaling conductors $400_2$–$404_2$ of the hundreds register are connected to the printer via conductors 400–404 and another obvious circuit is completed for start relay 515 whereupon the printer is caused to repeat the above operations for printing the hundreds digit 9 in response to ground upon conductors $401_2$ and $402_2$ of said hundreds register. Similar printing operations are repeated upon the operation of relays 512 and 513 in which the tens digit 1 and the units digit 9 are printed in response to ground on conductors $402_3$ and $404_3$ in the tens register and conductors $401_4$ and $402_4$ in the units register.

When the entire number has been printed, contacts 516 are momentarily closed in the printer whereupon an obvious circuit is closed for slow-release relay 505 which operates to remove locking ground from the relays locked in the registers, causing said relays to release and restore the registers to normal. Relay 505 also connects ground to conductor 109, completing thereby a circuit for relay 105 which extends from ground on said conductor, top outer contacts of relay 107, winding of relay 105 to battery. Relay 105 operates, opens the circuit of relay 103 which releases, in turn releasing relay 104 which disconnects conductor 102 from the sleeve of the connection and applies ground thereto in order to provide a busy test of the trunk for hunting 3rd selectors. Relay 103 further opens the circuit of relay 106 which, upon releasing, releases relay 107 which then releases relay 301 thereby disconnecting the cathodes of the tubes in the auxiliary groups from the relays of the various registers and further restores the trunk connecting circuit to normal. Relay 505 is made slow release in order to insure sufficient time after the opening of contacts 516 to unlock the registers and to perform the above-described functions for restoring the trunk connector to normal. The release of relay 301 opens the cathode circuits of tubes 201, 219, 221 and 239, respectively, causing said tubes to restore.

The removal of the signaling potential from conductor 119 also causes its removal from the control anode 19 of tube 19 and from control anode 19 of tube 619. These two tubes, with the controlling voltage removed, will now remain conducting only so long as the main anode voltage, applied through transformer 300, is on the positive half cycle of the voltage induced by source 304. When the voltage reverses and negative voltage is thus applied to the main anodes of these two tubes, they will cease to conduct and restore to normal. The identification circuit is now normal in all its parts and may again be reseized for identification operations by other trunks.

One feature of this invention has not been mentioned before because it could not be understood without a description of the invention. It is the immunity of the identification circuit to false operations which may result from the presence of transients in the sleeve conductors of the various lines and, therefore, upon their respective identifying conductors. In telephone offices such transients, due to various causes, are always present and while they are not of sufficient magnitude to cause the operation of electromagnetic apparatus connected thereto, may still be of sufficient magnitude to break down the control gap of a tube in each main group and thereby produce in consequence the series of operations described above that would result in a line [display] *recording* even though the [lines] *line* concerned would not be calling. In our invention, however, the tubes would operate if the main anode potential were on the positive half cycle of generator 304′ at the time the transient occurs. But the tubes would quench immediately when the generator advanced to the negative half cycle and thus restore the circuit to normal before the tube operations could be registered in the relays of the digit registers.

While we have described the principle of our invention in connection with its specific application to a particular type of telephone system and to a specific arrangement of gas-filled devices, it is to be understood that various other applications and embodiments thereof may be made by those skilled in the art without departing from the spirit of the invention as defined within the scope of the appended claims.

What is claimed is:

1. A calling line identification circuit for the lines of a telephone system comprising a plurality of electronic devices having control elements connected to said lines according to their numerical designation, and means responsive to the application of a potential to the control elements connected to one of said lines for operating the associated electron devices to indicate the identity of the line.

2. An identification circuit for the lines of a telephone system comprising in combination a plurality of electronic devices disposed coordinately relative to the lines of a telephone system, *and means* whereby a potential applied to any one of said lines causes the operation of any two of said devices in coordinate relation to each other to identify the line to which said potential was applied.

3. An identification circuit for the lines of a telephone system comprising in combination two groups of electronic devices disposed coordinately relative to the numerical designations of the lines of the system, means for applying a signaling potential through one of said lines when calling to an electronic device in each group whereby said devices are rendered conducting, and other electronic devices responsive to the conduction of said devices for identifying the numerical designation of said calling line.

4. A calling line identification circuit for the lines of a telephone system comprising two main groups of electronic devices having control electrodes connected to said lines, two auxiliary groups of electronic devices for each of said main groups of devices having control electrodes connected to the cathodes of the devices in the associated main group, means responsive to the application of a potential to the control electrodes of the devices in the two main groups for operating said devices whereby a potential is produced and applied to the control electrodes in the associated devices in the auxiliary groups, and means responsive to the application of said potential to said electrodes for operating the devices in the auxiliary groups to indicate the identity of the line.

5. A calling line identification circuit for the lines of a telephone system comprising in combination two main groups of electronic devices having control electrodes connected to said lines, two auxiliary groups of electronic devices for each of said main groups of devices having control electrodes connected to the cathodes of the devices in the associated main group, means responsive to the application of a potential to the control electrodes of the devices in the two main groups for operating said devices whereby a potential is produced and applied to the control electrodes in the associated devices in the auxiliary groups, and circuit closing means including settable registers available at said associated devices for operating said devices and setting said registers to indicate the identity of said line.

6. A calling line identification circuit for the lines of a telephone system comprising in combination two main groups of electronic devices having control electrodes connected to said lines, two auxiliary groups of electronic devices for each of said main groups of devices having control electrodes connected to the cathodes of the devices in the associated main group, means responsive to the application of a potential to the control electrodes of the line initiating a call for causing the associated electronic devices to become conducting, and means responsive to the operation of said devices for operating four of the devices in said two auxiliary groups for identifying the calling line to which said potential was applied.

7. An identification circuit for the lines of a telephone system comprising in combination an identifying conductor for each line, two groups of electronic devices disposed in coordinate pattern in relation to the numerical designation of each of the lines in the system, each electronic device in each group having a plurality of starting electrodes connected to as many line identifying conductors for identifying two digits of the associated line number, means for applying a signaling potential to the identifying conductor of one of said lines when calling and therethrough to the starting electrode in a device in each group connected thereto, whereby said devices are rendered conducting, and other electronic devices responsive to the conduction of said devices for identifying the numerical designation of the line to whose identifying conductor the signaling potential was applied.

8. An identification circuit for the lines of a telephone system comprising in combination with an identifying conductor for each line, a first pair of electronic devices for a group of said lines, each of said devices having a starting electrode for each line in the group connected to the identifying conductor thereof, a second pair of electronic devices for each device in said first pair of devices, each having a starting electrode connected to the cathode of a device in said first pair, means responsive to the application of a signaling potential to the identifying conductor of a calling line in the group and, therethrough, to the start electrodes of the first pair of devices connected to said conductor, for operating said pair of devices, means responsive to the operation of said first pair of devices for operating each of said second pair of devices, and means responsive to the operation of each of said second pair of devices for identifying the conductor to which said signaling potential was applied.

9. A calling line identification circuit for a group of lines, each of said lines having a designation consisting of a plurality of symbols divided into groups, comprising a group of thermionic devices for each group of symbols, there being in said thermionic devices as many control elements therefor as there are symbols in the group, the number of said elements in any one device being a multiple of the number of lines in said group of lines, an identifying conductor for each line extending to a control element in each group of devices in accordance with the symbol identity of its associated line, means for connecting a potential to the identifying conductor of a calling line in response to which the thermionic devices connected to said conductor are rendered conducting, and operative means included in the cathode circuit of said conducting thermionic devices for marking the designation of said calling line.

10. A calling line identification circuit for the lines of a telephone office comprising a plurality of thermionic devices having control elements connected to said lines according to their numerical designation, each of said thermionic devices having a source of alternating potential applied to their respective anodes, settable registers selectively connectable to said thermionic devices, when operated, and means responsive to the application of a potential to the control elements connected to one of said lines for operating the associated thermionic devices whereby said registers are rendered settably responsive to said operated thermionic devices for recording the identity of the calling line.

11. A calling line identification circuit for the lines of a telephone office comprising a plurality of thermionic devices having control elements connected to said lines according to said numerical designation, each of said thermionic devices having a source of alternating potential applied to their respective anodes, settable registers selectively connectable to said thermionic devices, when operated, and means responsive to the application of a potential to the elements connected to one of said lines for operating the associated thermionic devices whereby said registers are not connected to said operated thermionic devices if said potential is not sustained at said elements during the negative half cycles of said source of alternating potential connected to the main anodes of the operated thermionic devices.

WILLIAM H. T. HOLDEN.
BENJAMIN F. LEWIS.

REFERENCES CITED

The following references are of record in the file of this patent or the original patent:

UNITED STATES PATENTS

| Number | Name | Date |
|---|---|---|
| 2,023,589 | Hersey | Dec. 10, 1935 |
| 2,267,950 | Rhodes | Dec. 30, 1941 |